United States Patent
Sang et al.

(10) Patent No.: US 10,311,560 B2
(45) Date of Patent: Jun. 4, 2019

(54) METHOD AND SYSTEM FOR ESTIMATING BLUR KERNEL SIZE

(71) Applicant: HUAZHONG UNIVERSITY OF SCIENCE AND TECHNOLOGY, Wuhan (CN)

(72) Inventors: Nong Sang, Wuhan (CN); Lerenhan Li, Wuhan (CN); Luxin Yan, Wuhan (CN); Changxin Gao, Wuhan (CN); Yuanjie Shao, Wuhan (CN); Juncai Peng, Wuhan (CN); Shiwei Zhang, Wuhan (CN); Jin Wang, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 144 days.

(21) Appl. No.: 15/709,454

(22) Filed: Sep. 19, 2017

(65) Prior Publication Data
US 2018/0068430 A1    Mar. 8, 2018

Related U.S. Application Data

(63) Continuation-in-part of application No. PCT/CN2016/099335, filed on Sep. 19, 2016.

(30) Foreign Application Priority Data

Sep. 7, 2016 (CN) .......................... 2016 1 0806072

(51) Int. Cl.
*G06K 9/40*    (2006.01)
*G06T 7/00*    (2017.01)
(Continued)

(52) U.S. Cl.
CPC ............ *G06T 7/0002* (2013.01); *G06F 17/11* (2013.01); *G06F 17/18* (2013.01); *G06K 9/40* (2013.01);
(Continued)

(58) Field of Classification Search
CPC .................. G06T 7/0002; G06T 5/003; G06T 2207/20081; G06T 2207/20076;
(Continued)

(56) References Cited

U.S. PATENT DOCUMENTS 8,351,726 B2 * 1/2013 Albu ....................... G06T 5/003
                                                             348/208.1
8,768,313 B2 * 7/2014 Rodriguez .......... G06K 9/00986
                                                             382/118

(Continued)

*Primary Examiner* — Sheela C Chawan
(74) *Attorney, Agent, or Firm* — Mathias Scholl P.C.; Matthias Scholl

(57) ABSTRACT

A method for estimating a blur kernel size, the method including: (1) pre-processing a blurred image, to obtain an image, so that a size of the image satisfies an image input size of a multi-class convolutional neural network (CNN); (2) inputting the image into a multi-class CNN with completed training, to obtain a blur-kernel-size probability distribution vector; and (3) comparing each element in the blur-kernel-size probability distribution vector, so that an estimated blur kernel size of the blurred image is the blur kernel size corresponding to a largest element. The invention also provides a system for estimating a blur kernel size. The system includes an image pre-processing module, a training-set synthesizing module, a multi-class CNN module, and a blur kernel size estimation module.

9 Claims, 5 Drawing Sheets

(51) Int. Cl.
*G06N 3/02* (2006.01)
*G06F 17/11* (2006.01)
*G06F 17/18* (2006.01)
*G06T 5/00* (2006.01)
*G06K 9/46* (2006.01)

(52) U.S. Cl.
CPC ............ *G06K 9/4628* (2013.01); *G06N 3/02* (2013.01); *G06T 5/003* (2013.01); *G06T 2207/20076* (2013.01); *G06T 2207/20081* (2013.01); *G06T 2207/20084* (2013.01)

(58) Field of Classification Search
CPC ........ G06T 2207/20084; G06K 9/4628; G06K 9/40; G06F 17/18; G06F 17/11; G06N 3/02
USPC ....... 382/100, 128, 131, 181, 190, 195, 254, 382/255, 260, 264, 266, 274, 276, 279, 382/284; 348/207.99, 208.99, 208.4, 348/208.6
See application file for complete search history.

(56) References Cited

U.S. PATENT DOCUMENTS

| | | | |
|---|---|---|---|
| 9,036,032 B2 * | 5/2015 | Ishii | H04N 5/23248 |
| | | | 348/208.4 |
| 9,105,083 B2 * | 8/2015 | Rhoads | H04N 5/235 |
| 9,405,960 B2 * | 8/2016 | Yin | G06K 9/00221 |

* cited by examiner

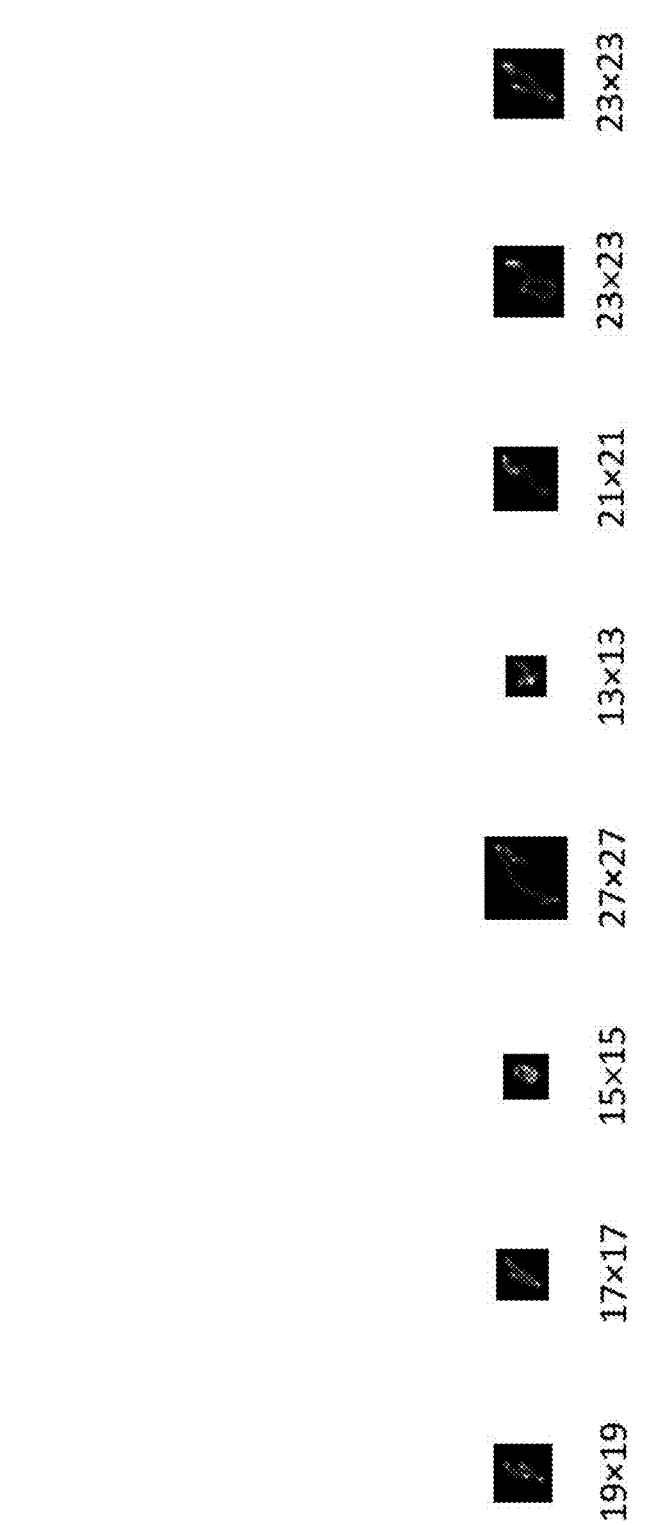

| Kernel | Ground-Truth | Estimated |
|---|---|---|
| 1 | 19×19 | 20.4×20.4 |
| 2 | 17×17 | 20.4×20.4 |
| 3 | 15×15 | 16.8×16.8 |
| 4 | 27×27 | 28.4×28.4 |
| 5 | 13×13 | 16.8×16.8 |
| 6 | 21×21 | 22.3×22.3 |
| 7 | 23×23 | 24.0×24.0 |
| 8 | 23×23 | 25.0×25.0 |

FIG. 4I

METHOD AND SYSTEM FOR ESTIMATING BLUR KERNEL SIZE

CROSS-REFERENCE TO RELAYED APPLICATIONS

This application is a continuation-in-part of International Patent Application No. PCT/CN2016/099335 with an international filing date of Sep. 19, 2016, designating the United States, now pending, and further claims foreign priority benefits to Chinese Patent Application No. 201610806072.4 filed Sep. 7, 2016. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to the field of pattern recognition technology, and more particularly, to a method and a system of estimating a blur kernel size for blurred images.

Description of the Related Art

When an imaging device is in an undesirable imaging environment, it tends to produce blurred images, causing interference to subsequent visual processing, such as recognition, tracking, and so on. There are many reasons for blurred images, including optical factors, atmospheric factors, artificial factors, technical factors, etc., and deblurring of images is of significance in many technological areas.

A blurred image B is usually obtained by a convolution operation of a sharp image I and a blur kernel k (also known as a point-spread function), as shown in formula (1):

$$B = k \otimes I + N, \quad (1)$$

where, N represents image noise, $\otimes$ represents a two-dimensional convolution operation. The blur types of images are mainly divided into three categories: Gaussian blur, motion blur and out-of-focus blur, of which the difference is reflected in the form of the blur kernel k. According to the above degradation model, image deblurring is a deconvolution process, which, when the blur kernel k and the sharp image I are unknown, is called blind deconvolution, and when the blur kernel k is known, is called non-blind deconvolution.

In practice, for a blurred image, both the blur kernel k and the sharp image I are unknown, so, it is an ill-posed problem to obtain two unknown parameters by one equation, i.e., the formula (1). For the ill-posed problem, most of the current research uses a maximum posteriori probability estimation method for estimation of the blur kernel k and the sharp image I, as shown in formula (2):

$$(\hat{I}, \hat{k}) = \arg\min_{I,k} \frac{1}{2} \|B - k \otimes I - N\|_2^2 + \alpha R(k) + \beta R(I), \quad (2)$$

where, $\|B - k \otimes I\|_2^2$ is a data approximation term, which ensures that the estimated sharp image $\hat{I}$ satisfies the degradation model; R(k) and R(I) are constraints of the blur kernel and the sharp image, respectively, also known as regularization items; by using different regularization items, the blur kernel and the sharp image are more compatible with actual prior information constraints.

Many studies have been conducted on the formula (2), aiming at enhancing image deblurring effect though deep study of prior information of a blur kernel and a sharp image. In the aforementioned image deblurring algorithm that is based on maximum posteriori probability, blur kernel size is a very important input parameter. The blur kernel size is mainly determined by a blur trajectory and a blur kernel support domain, which reflects blur degree, that is, the blur degree of a blurred image produced by a larger blur kernel size is greater than that produced by a smaller blur kernel size. In an image deblurring process, the closer the input blur kernel size to the real situation, the better the image restoration effect. A too large or too small input blur kernel size usually does not achieve the expected effect.

The following two methods of blur kernel size estimation for blurred images are known: (1) a trial-and-error method, which, according to experience, in condition of fixed other input parameters, inputs common blur kernel sizes, and by comparing the restoration results, selects the size with the best result as an input; (2) a method, which extracts edge information according to image content, and calculates image blur degree with a corresponding filter to estimate a blur kernel size. There are significant drawbacks with the two methods. Specifically, the first method is blind, with low rate of successful restoration by experience only, and the estimated blur kernel size lacks practical basis and thus is unconvincing. The second method only makes estimation of blur degree (that is, a blur trajectory), whereas a blur kernel size contains both blur trajectory information and blur kernel support domain information, so the estimated result cannot be directly used as an input parameter.

SUMMARY OF THE INVENTION

In view of the above drawbacks of the prior art or improvement demand, the present disclosure provides a method for estimating a blur kernel size, which aims at: through a deep-learning approach, establishing a blur kernel estimation problem as a multi-class problem, and through offline training of a multi-class convolutional neural network (CNN), performing relatively accurate blur kernel size estimation for any input blurred image, thereby solving the technical problems in the prior art, i.e., blur kernel estimation has blindness and estimation results cannot be directly used as input parameters of an optimization algorithm.

To achieve the above objectives, according to one embodiment of the present disclosure, there is provided a method for estimating a blur kernel size, the method comprising:

(1) pre-processing a blurred image B, to obtain an image $B_0$, so that a size of the image $B_0$ satisfies an image input size of a multi-class CNN;

(2) inputting the image $B_0$ into a multi-class CNN with completed training, to obtain a blur-kernel-size probability distribution vector; and (3) comparing the magnitude of each element in the blur-kernel-size probability distribution vector, so that an estimated blur kernel size of the blurred image B is the blur kernel size corresponding to a largest element.

In a class of this embodiment, the image $B_0$ is input into a multi-class CNN, to obtain a blur-kernel-size probability distribution vector:

$$P(B_{size} = (s_1, \ldots, s_m) | B_0) =$$

$$\frac{e^{\left(\omega_{(1,\ldots,m)}^{soft-max}\right)^T x_{full-connect}(B_0)}}{\sum_{t=1}^{m} e^{\left(\omega_m^{soft-max}\right)^T x_{full-connect}(B_0)}} = (p_1, \ldots, p_m),$$

where, $\omega_i^{soft-max}$ represents weight of a soft-max layer; $x_{full-connect}()$ represents an output of a full-connect layer; T represents matrix transpose; m represents the number of blur kernel size classes; each element in the obtained blur-kernel-size probability distribution vector represents the probability that the blur kernel size of the input image B is the blur kernel size corresponding to that element.

In a class of this embodiment, the training of the multi-class CNN comprises the following steps:

(31) selecting a training set for the multi-class CNN $$T=\{t_1, \ldots, t_n\}, n=u \times v \times m,$$

where, T represents a two-dimensional convolution operation of randomly collected natural scene images in number of u and randomly generated blur kernels in number of v$\lambda$m; u represents the number of images; m represents size classes of blur kernels; v represents the number of blur kernels in each size class; blurred images generated by the blur kernels in the same size class is labeled as an image category; then, pre-processing the training images obtained by the two-dimensional convolution operation, so that the sizes of the training images satisfy the image input size of the multi-class CNN;

(32) inputting one training image $t_1$ labeled in $s_l$ kernel size class into the multi-class CNN, to obtain a probability distribution sequence vector of each blur kernel size class: $P(B_{size}=(s_1,\ldots,s_l,\ldots,s_m)|t_1)$, and adjusting the weight of each layer of the network, so that the element corresponding to the blur kernel size class $s_l$ the training image $t_1$ is the largest element in the distribution sequence vector; and

(33) repeating the step (32) to sequentially input all images in the training set $T=\{t_1, \ldots, t_n\}$, n=u×v×m, to complete the training of the multi-class CNN.

In a class of this embodiment, the image pre-processing is using a down-sampling approach to obtain an input image, when the size of the blurred image to be processed is smaller than N times of the image input size M of the multi-class CNN; otherwise using a size interception approach to intercept the image containing blurred information to get an input image, where, according to experimental experience, 5≤N≤15, 25≤M≤100, preferably N=15, M=50.

In a class of this embodiment, the down-sampling approach is preferably a bilinear interpolation down-sampling approach.

According to another aspect of the present disclosure, there is provided a system for estimating a blur kernel size, and the system comprises the following modules:

an image pre-processing module, which is used for pre-processing a blurred image, by using a down-sampling approach to obtain an input image, when the size of the blurred image is smaller than N times of the image input size M of a multi-class CNN, otherwise by using a size interception approach to intercept an image containing blurred information to get an input image, where, according to experimental experience, 5≤N≤15, 25≤M≤100, preferably N=15, M=50;

a training-set synthesizing module, which is used for generating a training image set for training demands $$T=\{t_1, \ldots, t_n\}, n=u \times v \times m,$$

where, T represents a two-dimensional convolution operation of randomly collected natural scene images in number of u and randomly generated blur kernels in number of v$\lambda$m; u represents the number of images; m represents size classes of blur kernels; v represents the number of blur kernels in each size class; blurred images generated by the blur kernels in the same size class is labeled as an image category; and then inputting the training images obtained by the two-dimensional convolution operation into the image pre-processing module to obtain input images, so that the sizes of the input images satisfy the input image size of the multi-class CNN;

a multi-class CNN module, which is used in the training, for sequentially inputting the training image set $T=\{t_1, \ldots, t_n\}$, n=u×v×m into the multi-class CNN, to obtain a probability distribution sequence vector of each blur kernel size class: $P(B_{size}=(s_1, \ldots, s_l, \ldots, s_m)|T)$, and adjusting the weight of each layer of the network, so that the element corresponding to the blur kernel size class $s_l$ in the training image set T is the largest element in the distribution sequence vector;

and after completion of the training, inputting an image $B_0$ into the multi-class CNN, to obtain a probability distribution vector:

$$P(B_{size} = (s_1, \ldots, s_m) | B_0) =$$

$$\frac{e^{\left(\omega_{(1,\ldots,m)}^{soft-max}\right)^T x_{full-connect}(B_0)}}{\sum_{t=1}^{m} e^{\left(\omega_m^{soft-max}\right)^T x_{full-connect}(B_0)}} = (p_1, \ldots, p_m),$$

where, $\omega_i^{soft-max}$ represents weight of a soft-max layer; $x_{full-connect}()$ represents an output of a full-connect layer; T represents matrix transpose; m represents the number of blur kernel size classes; each element in the obtained blur-kernel-size probability distribution vector represents the probability that the blur kernel size of the input image B is the blur kernel size corresponding to that element; and a blur kernel size estimation module, which is used for blur kernel size estimation, and for comparing the magnitude of each element in the probability distribution vector, so that the estimated blur kernel size of the blurred image B is the blur kernel size corresponding to a largest element.

In a class of this embodiment, the down-sampling approach is a bilinear interpolation down-sampling approach.

In general, the method and system of the above technical solutions according to embodiments of the present disclosure, compared with the prior art, has the following technical features and advantages:

(1) the blur kernel size estimation results for blurred images, provided by the present disclosure, can be directly used for most existing image deblurring algorithms, thereby overcoming the drawbacks of the prior art, i.e., try-out estimation has blindness and estimation results cannot be directly used as input parameters; and (2) in the technical solutions of the present disclosure, a training set for a multi-class CNN is synthesized by using a large number of random collected sharp images and a large number of randomly generated blur kernels, so that the training set is more universal, and the multi-class CNN obtained by using this training set produces more accurate blur kernel size estimation.

BRIEF DESCRIPTION OF THE DRAWINGS

FIG. 4A-4I illustrate estimation results and real values of eight blur kernel sizes obtained according to a method of the present disclosure.

DETAILED DESCRIPTION OF THE EMBODIMENTS

For further illustrating the invention, experiments detailing a flowchart of a blur kernel size estimation method and system are described below. It should be understood that the specific embodiments described herein are merely illustrative of the invention and are not intended to limit the present disclosure. In addition, the technical features involved in the various embodiments of the present disclosure described below may be combined with each other, as long as they do not constitute a conflict with each other.

Figure 2:
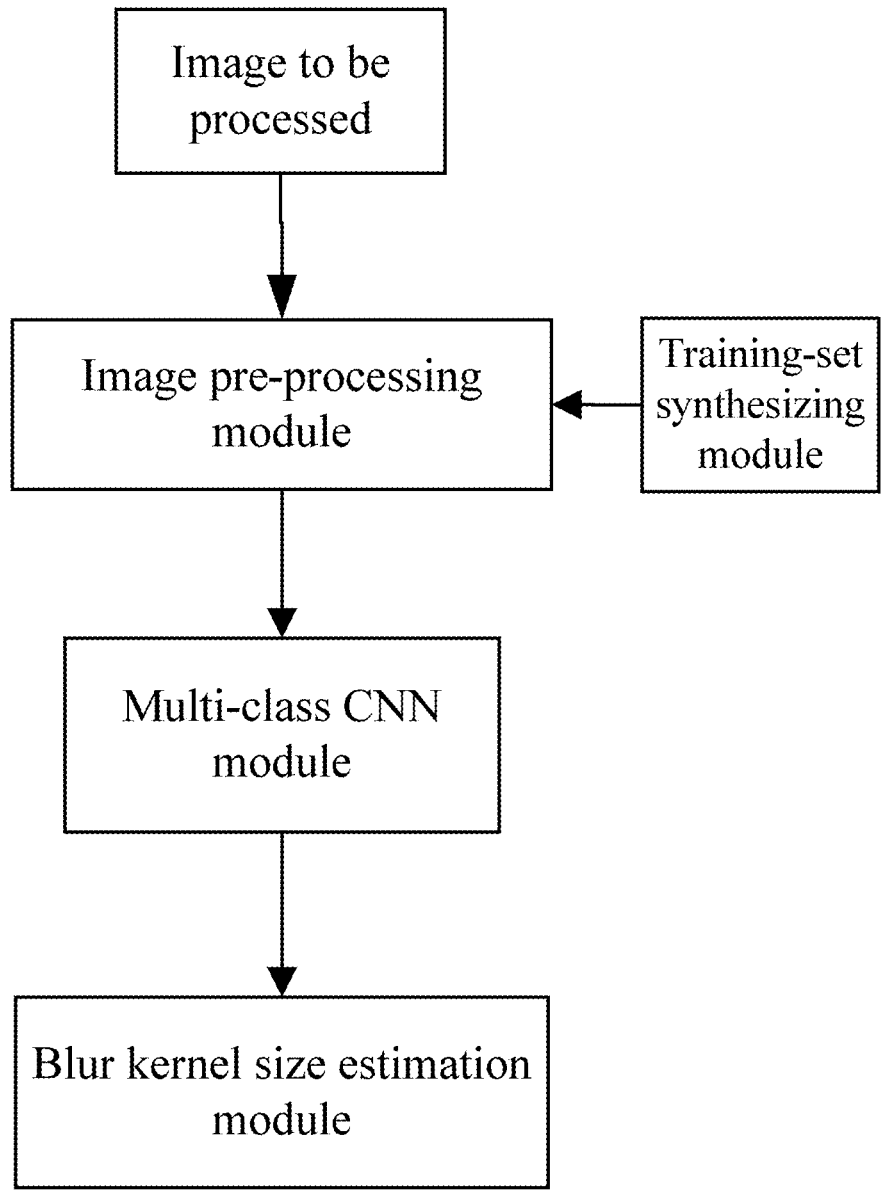
FIG. 2 is a block diagram of a system for estimating a blur kernel size in accordance with one embodiment of the present disclosure.

Firstly, the terms used in the present disclosure are explained and described below in combination with FIG. 2.

Blur kernel: also known as point-spread function; an image blur degradation model is usually expressed as formula (1); a blurred image is obtained by a convolution operation of a sharp image and a degradation function, this degradation function is called a blur kernel, which may also be referred to as a point-spread function or a degenerate function. Most of the existing image deblurring algorithms are based on this degenerate model, and the blur kernel and the sharp image are estimated by adding corresponding prior constraint information.

Blur kernel size: a blur kernel is usually set as an odd-size square matrix, and its support domain is usually formed by adding appropriate amount of "zero value" around the blur trajectory. Blur degrees obtained from convolution operation of different-size blur kernels and the same sharp image are also different, that is, blur kernel size affects the blur degree of an image to a great extent. Blur kernel size, as an important input parameter in an image deblurring process, affects image restoration results to a large extent. If the input size parameter is smaller than an actual size, the restoration result will emerge a lot of ringing-artifacts; If the input size parameter is larger than an actual size, the restoration result will be over-smooth and details will be lost. Only when the input size parameter is close to an actual size, will a satisfactory restoration result be obtained.

Convolutional neural network (CNN): CNN is a kind of artificial neural network, and has become a hotspot in the field of speech analysis and image recognition. Its weight sharing network structure makes it more similar to a biological neural network, thus reducing the complexity of the network model and reducing the number of weights. This advantage is more obvious when the input of the network is an image, therefore, images can be directly used as input of the network, thus avoiding complex feature extraction and data reconstruction in a traditional classification algorithm. A convolution network is a multi-layer sensor specially designed to recognize a two-dimensional shape. Such network structure has a high degree of invariance for translation, scaling, tilting, or other forms deformation.

Figure 1:
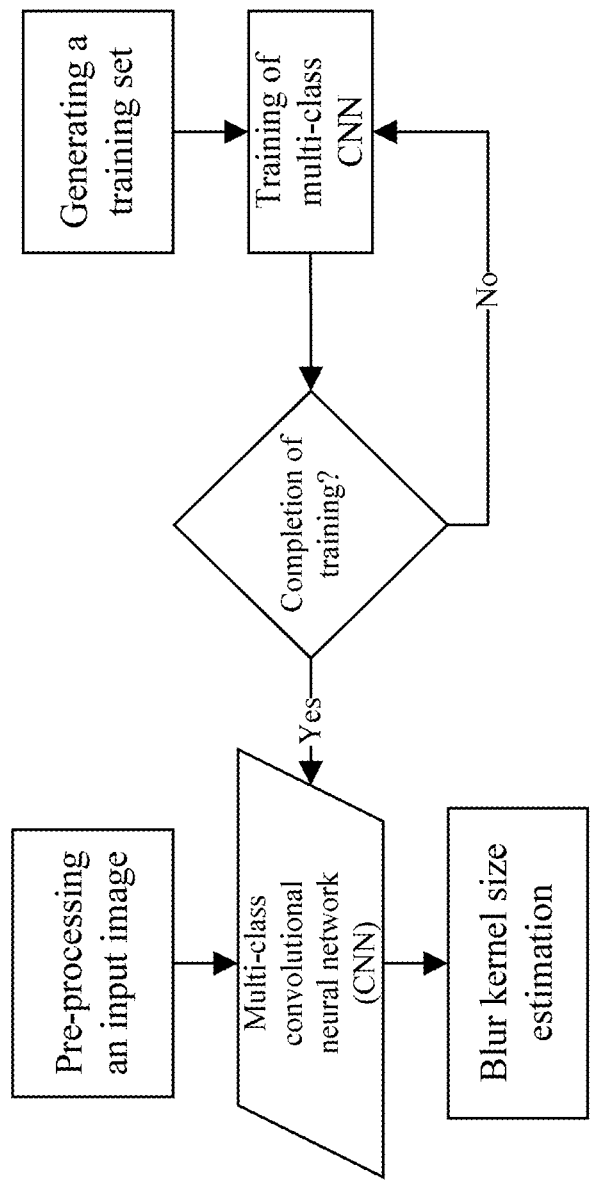
FIG. 1 is a flowchart of a method for estimating a blur kernel size in accordance with one embodiment of the present disclosure.

As shown in FIG. 1, it is a general flowchart of the blur kernel size estimation method for blurred images, provided by the present disclosure, and the method of the present inventive comprises the following steps:

(1) pre-processing a blurred image B, wherein, through a down-sampling approach, an input image $B_0$ having an image size satisfying the demands is obtained, and for a large-size image B, according to the demanded input size, an interception approach may be employed to intercept the input image $B_0$ containing blur information (such as large-scale structure information); according to experimental experience, in the condition of neither weakening the effective information in the image nor increasing the computational load of the training process, the input image size is set to 50×50;

(2) inputting the image $B_0$ into a multi-class (here, 20-class) CNN with completed training, the candidate blur-kernel-size set being S={11×11, 15×15, . . . , 95×95}, and calculating weights of different layers, to obtain a probability distribution vector;

(3) based on the vector P obtained in the step (2), comparing the magnitude of each element, to obtain the largest element $p_i$, i∈{1, . . . , 20}, so that, the blur kernel size $s_k$ represented by the category corresponding to a largest element is the estimated size of the blurred image B.

Figure 3:
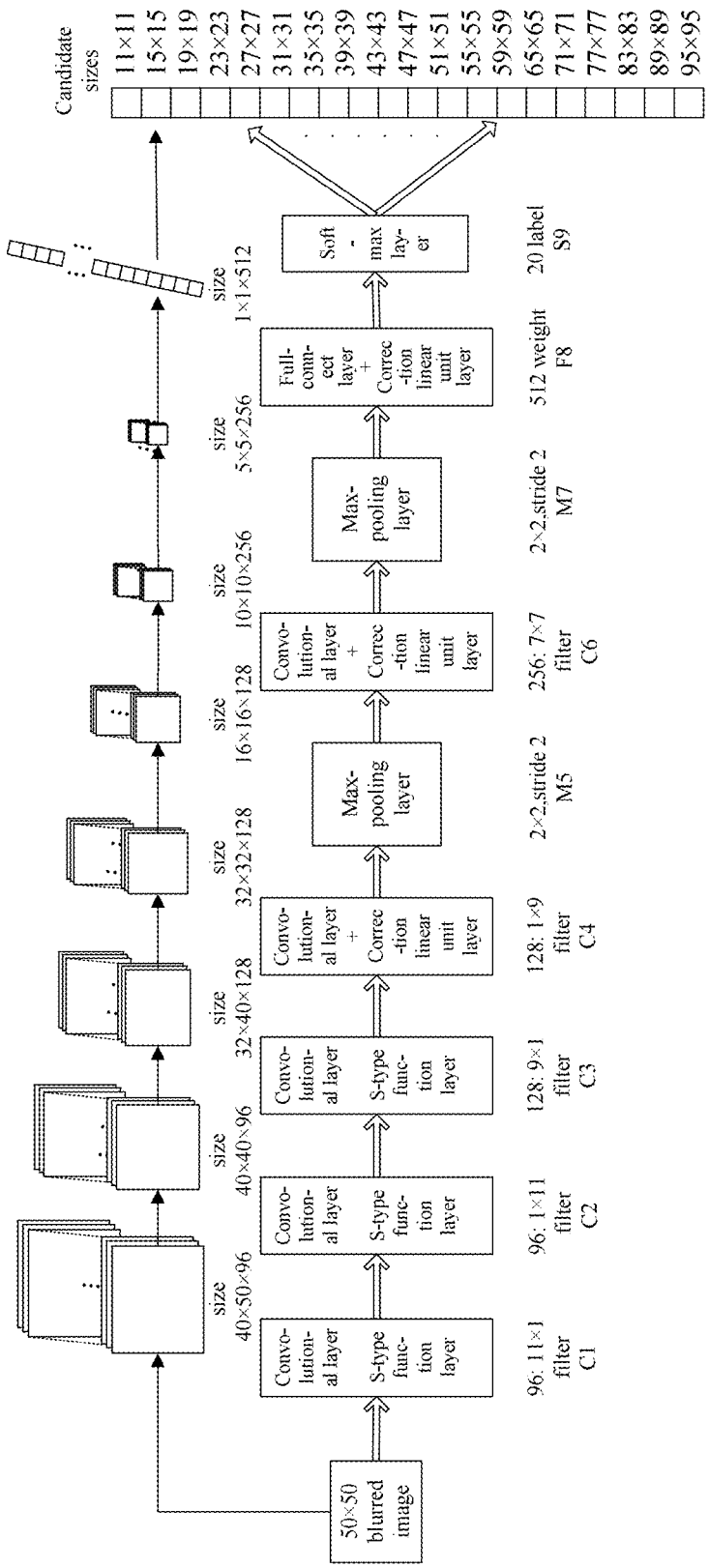
FIG. 3 is a schematic diagram of a multi-class CNN in accordance with one embodiment of the present disclosure.

As shown in FIG. 3, the present disclosure provides a schematic structural view of a CNN in accordance with the above-described embodiment. The network contains 9 layers in total, and constituted as "C1-C2-C3-C4-M5-C6-M7-F8-S9". The C1 layer is a convolutional layer consisting of 96 filters in size of 11×1×1 and one nonlinear activation function, i.e., sigmoid function; so, through calculation of the C1 layer, an input image $B_0$ in size of 50×50 will result an image sequence $X_1$ in size of 40×50×96; The C2 layer is a convolutional layer consisting of 96 filters in size of 1×11×96 and one nonlinear activation function—sigmoid function; so, through calculation of the C2 layer, the image sequence $X_1$ in size of 40×50×96 will result an image sequence $X_2$ in size of 40×40×96; The C3 layer is a convolutional layer consisting of 128 filters in size of 9×1×96 and one nonlinear activation function, i.e., sigmoid function; so, through calculation of the C3 layer, the image sequence $X_2$ in size of 40×40×96 will result an image sequence $X_3$ in size of 32×40×128; The C4 layer is a convolutional layer consisting of 128 filters in size of 1×9×128 and one nonlinear activation function, i.e., ReLU function; so, through calculation of the C4 layer, the image sequence $X_3$ in size of 32×40×128 will result an image sequence $X_4$ in size of 32×32×128; The M5 layer is a max-pooling layer, where, for each image, four adjacent pixel points are substituted with one of the four pixel points that has the largest gray value; so, through the M5 layer, the image sequence $X_4$ in size of 32×32×128 will result an image sequence $X_5$ in size of 16×16×128; The C6 layer is a convolutional layer consisting of 256 filters in size of 7×7×128 and one nonlinear activation function, i.e., ReLU function; so, through calculation of the C6 layer, the image sequence $X_5$ in size of 16×16×128 will result an image sequence $X_6$ in size of 10×10×256; The M7 layer is a max-pooling layer, where, for each image, four adjacent pixel points are substituted with one of the four pixel points that has the largest gray value; so, through the M7 layer, the image sequence $X_6$ in size of 10×10×256 will result an image sequence $X_7$ in size of 5×5256; The F8 and S9 layers are a full-connect layer and a soft-max loss layer, respectively; so, through these two layers, the sequence $X_7$ will result a probability distribution sequence $$P(B_{size} = (s_1, \ldots, s_{20}) | B_0) = \frac{e^{\left(\omega_{(1,\ldots,m)}^{S9}\right)^T x_{F8}(B_0)}}{\sum_{t=1}^{m} e^{\left(\omega_m^{S9}\right)^T x_{F8}(B_0)}} = (p_1, \ldots, p_{20}),$$

where, the value of each element in the vector represents the probability of the blur kernel size indicated by the category corresponding to that element, and the estimated blur kernel size of the blurred image B is the blur kernel size indicated by the image category corresponding to the element having the largest probability.

FIG. 4A-4I illustrate estimation results and real values of eight blur kernel sizes obtained according to the method of the embodiment.

The training process of the above-described neural network is as follows:
(1) randomly collecting sharp natural scene images, in order to perform convolution operation of the randomly collected sharp natural scene images and randomly generated blur kernels to obtain blurred image, and labeling the blur kernel sizes corresponding to the blurred images;
(2) taking an blurred image $B_e$ as an example, which is labeled in $s_1$ and has its image size down-sampled to satisfy the demands of the network, through calculation of the above-described neural network, the blurred image $B_e$ will result a probability distribution sequence vector corresponding to each size $P(B_{size}=(s_1, \ldots, s_l, \ldots, s_{20})|B_e)$, and adjusting the weight parameters of each layer of the network, so that the probability of the category indicated by the real blur kernel size $s_1$ corresponding to the blurred image $B_e$ is the largest in the sequence.
(3) performing multiple iterations of training by employing reverse-spread and stochastic-gradient-descent optimization algorithms, thus completing the training process.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A method for estimating a blur kernel size, the method comprising:
(1) pre-processing a blurred image B, to obtain an image $B_0$, so that a size of the image $B_0$ satisfies an image input size of a multi-class convolutional neural network (CNN);
(2) inputting the image $B_0$ into a multi-class CNN with completed training, to obtain a blur-kernel-size probability distribution vector; and
(3) comparing each element in the blur-kernel-size probability distribution vector, so that an estimated blur kernel size of the blurred image B is the blur kernel size corresponding to a largest element.

2. The method of claim 1, wherein the image $B_0$ is input into a multi-class CNN, to obtain the blur-kernel-size probability distribution vector as follows:

$$P(B_{size} = (s_1, \ldots, s_m) | B_0) = \frac{e^{\left(\omega_{(1,\ldots,m)}^{soft-max}\right)^T x_{full-connect}(B_0)}}{\sum_{t=1}^{m} e^{\left(\omega_m^{soft-max}\right)^T x_{full-connect}(B_0)}} = (p_1, \ldots, p_m)$$

where, $\omega_i^{soft-max}$ represents weight of a soft-max layer; $x_{full-connect}()$ represents an output of a full-connect layer; T represents matrix transpose; m represents the number of blur kernel size classes; each element in the obtained blur-kernel-size probability distribution vector represents the probability that the blur kernel size of the blurred image B is the blur kernel size corresponding to that element.

3. The method of claim 1, wherein the training of the multi-class CNN comprises:
(31) selecting a training set for the multi-class CNN $T=\{t_1, \ldots, t_n\}, n=u \times v \times m,$ where, T represents a two-dimensional convolution operation of randomly collected natural scene images in number of u and randomly generated blur kernels in number of v×m; u represents the number of images; m represents size classes of blur kernels; v represents the number of blur kernels in each size class; blurred images generated by the blur kernels in the same size class is labeled as an image category; then, pre-processing the training images obtained by the two-dimensional convolution operation, so that the sizes of the training images satisfy the image input size of the multi-class CNN;
(32) inputting one training image $t_1$ labeled in $s_l$ blur kernel size class into the multi-class CNN, to obtain a probability distribution sequence vector of each blur kernel size class: $P(B_{size}=(s_1, \ldots, s_l, \ldots, s_m)|t_1)$, and adjusting the weight of each layer of the network, so that the element corresponding to the blur kernel size class $s_l$ of the training image $t_1$ is the largest element in the distribution sequence vector; and
(33) repeating the step (32) to sequentially input all images in the training set $T=\{t_1, \ldots, t_n\}$, $n=u \times v \times m$, to complete the training of the multi-class CNN.

4. The method of claim 3, wherein the image pre-processing is using a down-sampling approach to obtain an input image, when the size of the blurred image to be processed is smaller than N times of the image input size M of the multi-class CNN; otherwise using a size interception approach to intercept the image containing blurred information to get an input image.

5. The method of claim 4, wherein the down-sampling approach is a bilinear interpolation down-sampling approach.

6. The method of claim 1, wherein the image pre-processing is using a down-sampling approach to obtain an input image, when the size of the blurred image to be processed is smaller than N times of the image input size M of the multi-class CNN; otherwise using a size interception approach to intercept the image containing blurred information to get an input image.

7. The method of claim 6, wherein the down-sampling approach is a bilinear interpolation down-sampling approach.

8. A system for estimating a blur kernel size, the system comprising:
an image pre-processing module, which is used for pre-processing a blurred image, by using a down-sampling approach to obtain an input image, when the size of the blurred image is smaller than N times of the image input size M of a multi-class CNN, otherwise by using a size interception approach to intercept an image containing blurred information to get an input image;
a training-set synthesizing module, which is used for generating a training image set for training demands $T=\{t_1, \ldots, t_n\}$, $n=u \times v \times m$, where, T represents a two-dimensional convolution operation of randomly collected natural scene images in number of u and randomly generated blur kernels in number of v×m; u represents the number of images; m represents size classes of blur kernels; v represents the number of blur kernels in each size class; blurred images generated by the blur kernels in the same size class is labeled as an image category; and then inputting the training images obtained by the two-dimensional convolution operation into the image pre-processing module to obtain input images, so that the sizes of the input images satisfy the input image size of the multi-class CNN;
a multi-class CNN module, which is used in the training, for sequentially inputting the training image set $T=\{t_1, \ldots, t_n\}$, $n=u \times v \times m$ into the multi-class CNN, to obtain a probability distribution sequence vector of each blur kernel size class: $P(B_{size}=(s_1, \ldots, s_l, \ldots, s_m)|T)$, and adjusting the weight of each layer of the network, so that the element corresponding to the blur kernel size class $s_l$ in the training image set T is the largest element in the distribution sequence vector;
and after completion of the training, inputting an image $B_0$ into the multi-class CNN, to obtain a probability distribution vector as follows:

$$P(B_{size} = (s_1, \ldots, s_m) \mid B_0) = \frac{e^{\left(\omega_{(1,\ldots,m)}^{soft-max}\right)^T x_{full-connect}(B_0)}}{\sum_{t=1}^{m} e^{\left(\omega_m^{soft-max}\right)^T x_{full-connect}(B_0)}} = (p_1, \ldots, p_m),$$

where, $\omega_i^{soft-max}$ represents weight of a soft-max layer; $x_{full-connect}(\ )$ represents an output of a full-connect layer; T represents matrix transpose; m represents the number of blur kernel size classes; each element in the obtained blur-kernel-size probability distribution vector represents the probability that the blur kernel size of the blurred image B is the blur kernel size corresponding to that element; and
a blur kernel size estimation module, which is used for blur kernel size estimation, and for comparing each element in the probability distribution vector, so that the estimated blur kernel size of the blurred image B is the blur kernel size corresponding to a largest element.

9. The system of claim 8, wherein the down-sampling approach is a bilinear interpolation down-sampling approach.

* * * * *